(12) United States Patent
Staal et al.

(10) Patent No.: US 12,064,929 B2
(45) Date of Patent: Aug. 20, 2024

(54) APPARATUS, SYSTEM, AND METHOD FOR REPAIRING COMPOSITE SANDWICH PANELS

(71) Applicant: The Boeing Company, Chicago, IL (US)

(72) Inventors: Remmelt Andrew Staal, Irvine, CA (US); Justin H. Register, Charleston, SC (US); Ernie Fidgeon, Ymir (CA); Glory C. Edwards, Edmonds, WA (US); Gregory J. Smith, Philipsburg, MT (US)

(73) Assignee: The Boeing Company, Arlington, VA (US)

( * ) Notice: Subject to any disclaimer, the term of this patent is extended or adjusted under 35 U.S.C. 154(b) by 38 days.

(21) Appl. No.: 17/718,020

(22) Filed: Apr. 11, 2022

(65) Prior Publication Data

US 2022/0388258 A1    Dec. 8, 2022

Related U.S. Application Data

(60) Provisional application No. 63/196,102, filed on Jun. 2, 2021.

(51) Int. Cl.
*B29C 73/02* (2006.01)
*B29C 73/10* (2006.01)
*B29C 73/26* (2006.01)

(52) U.S. Cl.
CPC ............ *B29C 73/02* (2013.01); *B29C 73/10* (2013.01); *B29C 73/26* (2013.01); *B29C 2073/264* (2013.01)

(58) Field of Classification Search
CPC ......... B29C 73/02; B29C 73/10; B29C 73/30; B29C 73/26; B29C 2073/264; B29C 73/34

USPC ........................................................ 156/73.5
See application file for complete search history.

(56) References Cited

U.S. PATENT DOCUMENTS

| | | | | |
|---|---|---|---|---|
| 5,622,661 | A * | 4/1997 | Cederstrom | B29C 73/26 264/36.22 |
| 6,656,299 | B1 * | 12/2003 | Grosskrueger | B29C 73/30 156/92 |
| 2014/0141190 | A1 * | 5/2014 | Shigetomi | B64F 5/40 428/63 |

OTHER PUBLICATIONS

Hanna, S et al., Method of Repairing a Compositte Material, (Sep. 12, 2016), with WO-2017046573-A1 attached at end. (Year: 2016).*

* cited by examiner

*Primary Examiner* — S. Behrooz Ghorishi
*Assistant Examiner* — Gregory C. Grosso
(74) *Attorney, Agent, or Firm* — Kunzler Bean & Adamson

(57) ABSTRACT

Disclosed herein are a repair apparatus, system, and method for a composite sandwich structure. The repair is suited for reinforcing a sandwich panel having a first sheet and a second sheet opposite the first sheet. A core is interposed between and coupled to the first sheet and the second sheet. The repair uses a potting compound packed into an abnormality of the core and located on the outer surface of the first sheet. A patch is coupled to the outer surface of the first sheet over the abnormality of the core and cured. The cured potting compound is interposed between and bonded to the patch and the abnormality of the core and bonded to the patch and the outer surface of the first sheet to form a structural reinforcement.

20 Claims, 13 Drawing Sheets

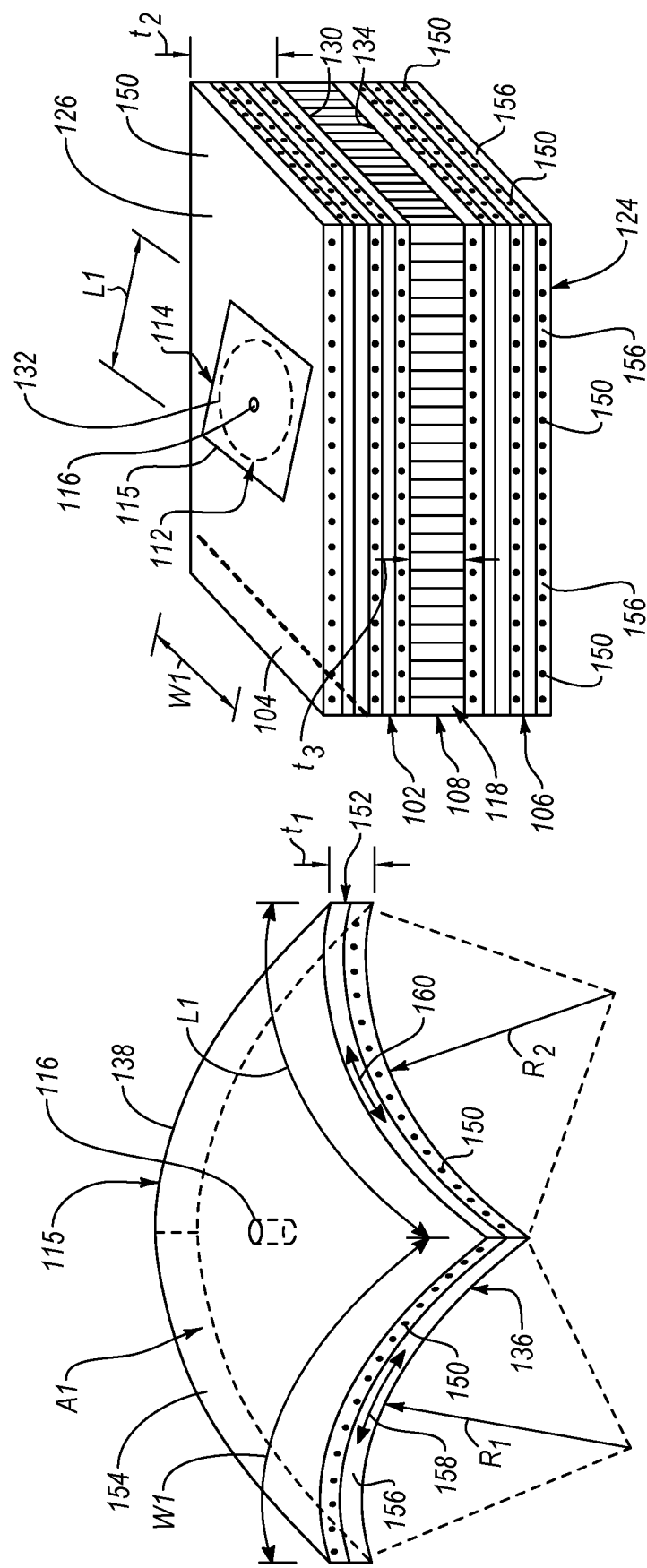

APPARATUS, SYSTEM, AND METHOD FOR REPAIRING COMPOSITE SANDWICH PANELS

CROSS-REFERENCE TO RELATED APPLICATION

This application claims the benefit of U.S. Provisional Patent Application No. 63/196,102, filed Jun. 2, 2021, which is hereby incorporated by reference herein in its entirety.

FIELD

This disclosure relates generally to methods for repairing composite structures. More particularly, this disclosure relates to methods for repairing a section of a composite sandwich panel.

BACKGROUND

Composite sandwich panels, or sandwich structures, are made at least partially from fiber-reinforced polymer layers separated by a core material. The core material helps promote several structural benefits, such as stiffness and/or strength, in a lightweight package. Accordingly, sandwich structures are beneficial for use in structural assemblies designed to have low weight, high strength, high stiffness, and/or other structural properties.

Sandwich structures provide a lightweight structural configuration that carries bending loads. Sandwich structures generally have a core interposed between a first sheet and a second sheet. In some examples, the first sheet and the second sheet are two solid laminates and are commonly referred to as a facesheet and a backsheet, respectively. The core separates the first sheet from the second sheet and helps to increase the bending-strength-to-weight ratios of the sandwich structure, compared to a structure without the core and just the first sheet and the second sheet.

Sandwich structures are subject to abnormalities, such as buckling and/or disbonded layers. Conventional repair processes for sandwich panels generally involve two or more independent stages. Each stage uses a separate curing process. Because each curing process requires significant time, cost, and labor, and the curing processes are not performed concurrently, conventional repair processes can cause significant delays. Each curing stage increases the time, cost, and labor involved in restoring the honeycomb panel to an operable condition. Rapidly and efficiently restoring the design strength of sandwich panels that have such abnormalities can be difficult, especially in challenging repair environments.

SUMMARY

The subject matter of the present application has been developed in response to the present state of the art, and in particular, in response to the shortcomings of prior art techniques for repairing composite sandwich panels that have not yet been fully solved by currently available techniques. Accordingly, the subject matter of the present application has been developed to provide a reliable and structurally sufficient repair method, in a timely and efficient matter, that overcomes at least some of the above-discussed shortcomings of prior art techniques.

The following is a non-exhaustive list of examples, which may or may not be claimed, of the subject matter, disclosed herein.

In one example, a sandwich structure comprises a first sheet having an outer surface and a second sheet opposite the first sheet. The sandwich structure also comprises a core interposed between and coupled to the first sheet and the second sheet. The sandwich structure additionally comprises a structural reinforcement coupled to the outer surface of the first sheet over an abnormality of the core. The structural reinforcement has a patch comprising a ply and a cured potting compound packed into the abnormality of the core and further located on the outer surface of the first sheet. The cured potting compound is interposed between and bonded to the patch and the abnormality of the core. The cured potting compound is interposed between and bonded to the patch and the outer surface of the first sheet. The preceding subject matter of this paragraph characterizes example 1 of the present disclosure.

The patch comprises a relief hole extending through a thickness of the patch and a portion of the cured potting compound is located within the relief hole. The preceding subject matter of this paragraph characterizes example 2 of the present disclosure, wherein example 2 also includes the subject matter according to example 1.

The core comprises a honeycomb structure adjacent to the abnormality. The honeycomb structure provides the first sheet and the second sheet a design bending strength. The cured potting compound at the abnormality of the core provides a repair bending strength and the repair bending strength is equal to or greater than the design bending strength. The preceding subject matter of this paragraph characterizes example 3 of the present disclosure, wherein example 3 also includes the subject matter according to any one of examples 1-2 above.

The sandwich structure comprises a bushing. The core is a honeycomb structure that surrounds the cured potting compound, and the cured potting compound surrounds the bushing. The preceding subject matter of this paragraph characterizes example 4 of the present disclosure, wherein example 4 also includes the subject matter according to any one of examples 1-3 above.

The sandwich structure is an aircraft comprising an external wetted surface and the outer surface of the first sheet and the patch of the structural reinforcement define the external wetted surface of the aircraft. The preceding subject matter of this paragraph characterizes example 5 of the present disclosure, wherein example 5 also includes the subject matter according to any one of examples 1-4 above.

The core is made of a foam material, and the cured potting compound extends through a partial thickness of the core. The preceding subject matter of this paragraph characterizes example 6 of the present disclosure, wherein example 6 also includes the subject matter according to any one of examples 1-5 above.

The first sheet comprises an inner surface opposite the outer surface and a peripheral edge through a thickness of the first sheet that extends between the outer surface and the inner surface of the first sheet. The second sheet further comprises an inner surface. The patch comprises a first surface opposite a second surface. The cured potting compound is bonded to a portion of the inner surface of the first sheet, to the peripheral edge of the first sheet, to the inner surface of the second sheet, to an entirety of the first surface of the patch, and to a portion of the second surface of the patch. The preceding subject matter of this paragraph characterizes example 7 of the present disclosure, wherein example 7 also includes the subject matter according to any one of examples 1-6 above.

The inner surface of the second sheet further comprises an adhesive directly interposed between the second sheet and the cured potting compound in the abnormality of the core. The preceding subject matter of this paragraph characterizes example 8 of the present disclosure, wherein example 8 also includes the subject matter according to example 7 above.

Additionally, disclosed herein is a method of installing a structural reinforcement on a sandwich structure. The method comprises removing a portion of a first sheet and a core of the sandwich structure to form a cavity in the first sheet and the core of the sandwich structure and filling the cavity in the sandwich structure with an uncured potting compound. The uncured potting compound is applied on a surface of a patch and the cavity in the core and an outer surface of the first sheet are covered with the patch. The uncured potting compound extends between an inner surface of a second sheet of the sandwich structure and the patch. The uncured potting compound extends between the outer surface of the first sheet of the sandwich structure and the patch. The uncured potting compound is cured. The preceding subject matter of this paragraph characterizes example 9 of the present disclosure.

A portion of the first sheet and the core are removed to form the cavity and the outer surface of the first sheet is abraded. The preceding subject matter of this paragraph characterizes example 10 of the present disclosure, wherein example 10 also includes the subject matter according to example 9 above.

Prior to filling the cavity with the uncured potting compound, the method comprises removing a coating layer on the first sheet surrounding the cavity and penetrating the core under the first sheet to create a cavity extending to the second sheet. loose fibers from the coating layer on the outer surface of the first sheet are removed. The preceding subject matter of this paragraph characterizes example 11 of the present disclosure, wherein example 11 also includes the subject matter according to any one of examples 9-10 above.

Prior to filling the cavity with the uncured potting compound debris from the cavity in the core is removed and the core is heated to remove moisture. The preceding subject matter of this paragraph characterizes example 12 of the present disclosure, wherein example 12 also includes the subject matter according to any one of examples 9-11 above.

Prior to applying the uncured potting compound onto the surface of the patch, the patch is penetrated to create a relief hole extending between a second surface of the patch and the surface that the uncured potting compound is to be applied to the patch. The preceding subject matter of this paragraph characterizes example 13 of the present disclosure, wherein example 13 also includes the subject matter according to any one of examples 9-12 above.

Filling the cavity with the uncured potting compound further comprises packing the uncured potting compound into the cavity until the uncured potting compound abuts an inner surface of the first sheet. When the uncured potting compound is cured, the inner surface of the second sheet bonds to the inner surface of the first sheet. The preceding subject matter of this paragraph characterizes example 14 of the present disclosure, wherein example 14 also includes the subject matter according to any one of examples 9-13 above.

After the cavity is covered with the patch and prior to curing the uncured potting compound excess uncured potting compound is removed from the outer surface of the first sheet. Excess uncured potting compound adjacent to a relief hole is removed from a second surface of the patch. The preceding subject matter of this paragraph characterizes example 15 of the present disclosure, wherein example 15 also includes the subject matter according to any one of examples 9-14 above.

After the cavity is covered with the patch and prior to curing the uncured potting compound a vacuum bag and a heat blanket is applied over the patch. The heat blanket applies heat and/or the vacuum bag reduces pressure locally. The uncured potting compound is cured to form a thermoset bond between the patch and the outer surface of the first sheet. The preceding subject matter of this paragraph characterizes example 16 of the present disclosure, wherein example 16 also includes the subject matter according to any one of examples 9-15 above.

Prior to covering the cavity with the patch, the method include packing loose fibers (e.g., glass fibers and/or carbon fibers) into the uncured potting compound. The uncured potting compound is cured with the packed fibers. The preceding subject matter of this paragraph characterizes example 17 of the present disclosure, wherein example 17 also includes the subject matter according to any one of examples 9-16 above.

A bushing is installed within the cavity and the uncured potting compound. The bushing extends through a relief hole in the patch. The preceding subject matter of this paragraph characterizes example 18 of the present disclosure, wherein example 18 also includes the subject matter according to any one of examples 9-17 above.

The patch is heated to mold the structural reinforcement. The patch comprises an area and a contour and a first ply is pre-arranged in a predefined orientation relative to a second ply in the patch. The patch is heated to at least partially bond the first ply to the second ply in the patch and/or change the contour of the structural reinforcement. The preceding subject matter of this paragraph characterizes example 19 of the present disclosure, wherein example 19 also includes the subject matter according to any one of examples 9-18 above.

Further disclosed herein is a structural reinforcement for reinforcing a sandwich structure. The structural reinforcement comprises a cured potting compound and a patch. The patch comprises a first ply and a second ply. The first ply has fibers embedded in a matrix to provide a strength to the first ply. The first ply defines a surface of the patch that is bonded to the cured potting compound. The second ply has fibers embedded in a matrix to provide a strength to the second ply. The first ply is oriented relative to the second ply to provide a predetermined reinforcement strength to the patch. The preceding subject matter of this paragraph characterizes example 20 of the present disclosure.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not, therefore, to be considered to be limiting of its scope, the subject matter will be described and explained with additional specificity and detail through the use of the drawings, in which:

FIG. 2 is a schematic perspective view of a structural reinforcement, according to one or more examples of the present disclosure;

FIG. 3 is a schematic perspective view of a composite sandwich structure having a structural reinforcement applied on a first sheet of the composite sandwich structure, according to one or more examples of the present disclosure;

DETAILED DESCRIPTION

Figure 1:
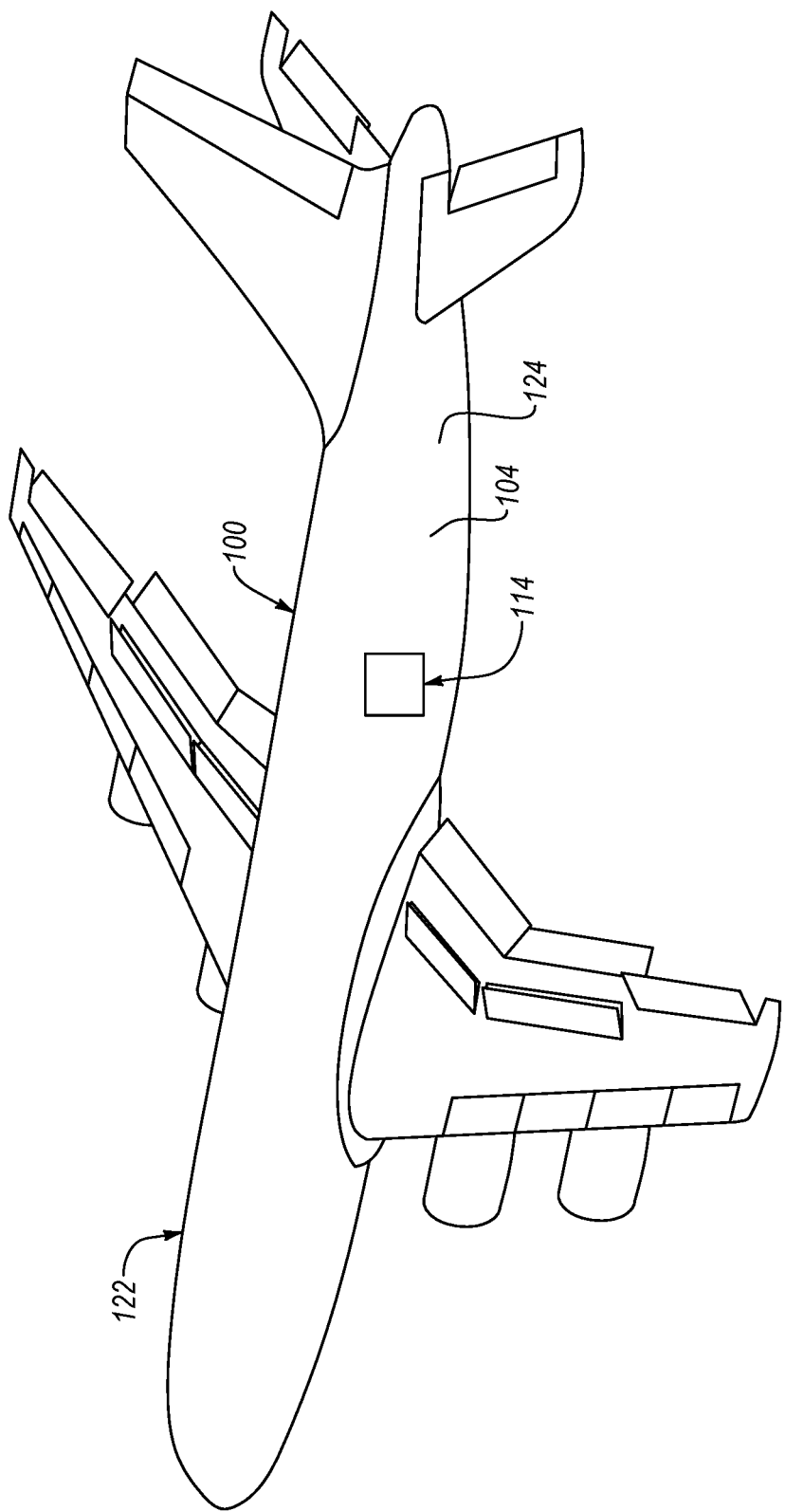
FIG. 1 is a schematic perspective view of an aircraft having a structural reinforcement on a composite sandwich structure of the aircraft, according to one or more examples of the present disclosure.

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure; however, absent an express correlation to indicate otherwise, an implementation may be associated with one or more examples.

Composite sandwich panels, such as honeycomb structures or sandwich structures having a core other than a honeycomb core (e.g., a foam core), are used in applications where lightweight and stiff materials are desirable. Generally, composite sandwich panels include a first sheet (i.e., a facesheet or first layer), a second sheet (i.e., backsheet or second layer) opposite the first sheet, and a core interposed between the first sheet and the second sheet. The core increases the bending strength of the first sheet and the second sheet.

An abnormality in the composite sandwich panel, such as damaged plies, worn plies, or delaminated plies, reduces the design strength and/or structural properties of the composite sandwich panel. For example, a bond between the core and the first sheet (or the second sheet) can become delaminated, or the core, first sheet, and/or second sheet can buckle. Similarly, a compressive load can dent or damage one or more plies on the first sheet (e.g., when the first sheet defines an outer surface of a structure). Conventional methods for repairing such abnormalities in the field utilize specialized equipment, and multiple curing steps, to remove the abnormality and repair the composite sandwich panel.

Disclosed herein is a process for a structural repair that restores the structural strength and/or capabilities of the composite sandwich panel (i.e., the sandwich structure). The structural reinforcement is cured, with potting compound, in a single curing step to enable an efficient and customizable structural repair. The structural repair restores or increases the strength of the original sandwich structure prior to formation of the abnormality.

As used herein, to bond, bonding, "is bonded," and other variants of "bond" means that one structure is coupled to and/or joined to an adjacent structure. The bonding process may use adhesives, mechanical hook-and-loop fasteners, chemical bonds, etc., to join the structures together in a bond. Bonding includes, but is not limited to, adhesive bonding, solvent bonding, and/or thermal bonding between two structures. For example, thermal bonding may result in a thermoset or thermoplastic bond.

As used herein, to cure, curing, "is cured," etc., is a type of thermal bonding process. Other bonding mechanisms may be present in a cured joint, but the curing process involves solidifying a liquid or semi-liquid material into a solid material that joins adjacent parts. Curing includes the process of applying heat, and optionally pressure, to the materials of two adjacent structures to melt a portion of the materials and then allowing the melted portion to solidify. For example, welding, soldering, brazing, and epoxy glues are different types of curing processes. In each process, a liquid intermediary is introduced and/or heated and then cured. The resulting cured bond forms a solid structural material that joins and couples the two adjacent structures. As illustrated by the epoxy and welding examples, curing may use local chemical reactions, electrical potential/current, mechanical forces, etc., to generate a local layer of melted liquid material mixed and cured into the adjacent structure. As such, a bond is a broad term that includes cured joints and structures.

Referring to FIG. 1, according to one example, a sandwich structure 100 of an overall composite structure is shown. In the illustrated example, the overall composite structure is an aircraft 122 and the sandwich structure 100 is a component of the aircraft 122. For example, the sandwich structure 100 can be any of various parts of the aircraft 122, such as the fuselage, wing, or stabilizers. The sandwich structure 100 also includes a structural reinforcement 114 that is coupled to an outer surface 104 of the sandwich structure 100. Although not shown in FIG. 1, the structural reinforcement 114 is coupled to the outer surface 104 of the sandwich structure 100 over an abnormality in (e.g., damage to) the sandwich structure 100. In effect, the structural reinforcement 114 repairs the abnormality in the sandwich structure 100.

With reference to FIGS. 1-3, in various examples, the sandwich structure 100 is an aircraft 122. The aircraft 122 has an external wetted surface 124 and an internal non-wetted surface 126. For example, the sandwich structure 100 may have a surface exposed to the airstream on the exterior of the aircraft 122. In one example, the outer surface 104 of the first sheet 102 and the structural reinforcement 114 are located on the external wetted surface 124 of the aircraft 122. In another example shown in FIG. 3, the outer surface 104 of the first sheet 102 is an internal non-wetted surface 126 and the second sheet 106 is an external wetted surface 124. In various examples, sandwich structures 100 are used on external wetted surface 124 in the fairings, moving trailing edge, doors, landing gear doors, and the like. In other examples, both the first sheet 102 and the second sheet 106 of the sandwich structure 100 are internal non-wetted surfaces 126. For example, sandwich structures 100 are used in the internal floors, galleys, lavatories, etc.

The sandwich structure 100 is designed to provide strength, e.g., bending strength, for the overall composite structure. In some examples, when the sandwich structure 100 has an abnormality, the bending strength is reduced at the abnormality. Accordingly, the structural reinforcement 114, by repairing an inconsistency or abnormality in the sandwich structure 100, helps restore the bending strength of the sandwich structure 100. In other words, the structural reinforcement 114 reinforces and/or increases the strength at the abnormality 112 to equal or exceed the original design strength of the sandwich structure 100.

In various examples, the sandwich structure 100 provides other design tolerances and/or strengths, e.g., bending, bearing, compression, shear, and/or tension. For example, the design tolerance indicates that the sandwich structure 100 has a greater strength than the expected load by some factor. Similar design tolerances are established for all the expected loads on the sandwich structure 100. For example, the sandwich structure 100 can have one or more bending, bearing, compression, shear, or tensile strengths, each with an associated tolerance. In various examples, the structural reinforcement 114 provides a repair strength to sandwich structure 100 that may equal or exceed the design strength tolerance of the sandwich structure 100.

Figure 12:
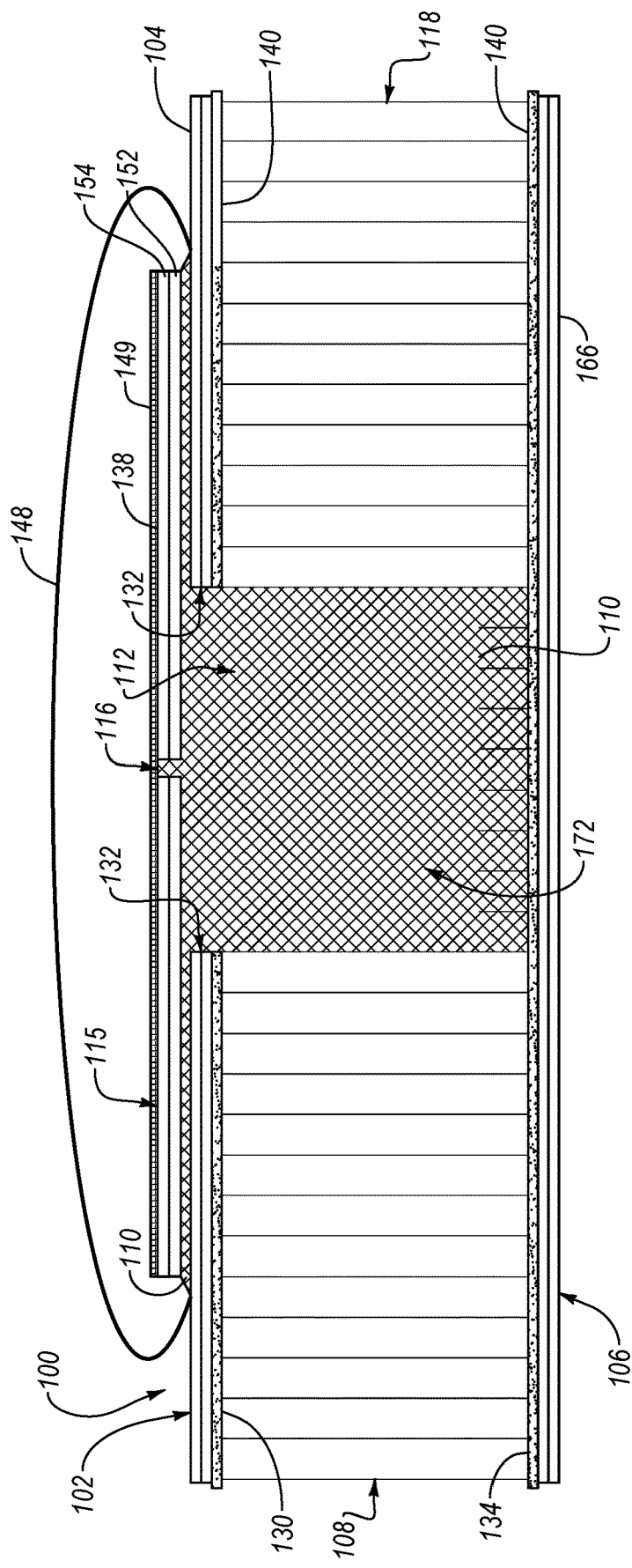
FIG. 12 is a schematic, sectional, side elevation view of a vacuum bag attached to the honeycomb structure of FIG. 11 and enclosing the structural reinforcement, according to one or more examples of the present disclosure.

Referring to FIG. 12, the structural reinforcement 114 includes a cured potting compound 110 and a patch 115. As shown in more detail in FIG. 2, the patch 115 includes one or more plies, in a stacked arrangement. For example, the patch 115 can include a first ply 152 and a second ply 154 that are heated and pre-cured to form part of the structural reinforcement 114, which, in some examples, can be applied to the sandwich structure 100 in the field.

The patch 115 of the structural reinforcement 114 has similar characteristics as the material of the sandwich structure 100, which helps to facilitate bonding between the patch 115 and the material of the sandwich structure 100. For example, the material of the sandwich structure 100 and the structural reinforcement 114 have the same or similar coefficients of thermal expansion and/or electrical conductivities. In some examples, the structural reinforcement 114 is at least partially made from the same material as the sandwich structure 100. More specifically, the first ply 152 and the second ply 154 of the patch 115 can be made of the same or similar material as a first sheet 102 and/or a second sheet 106 of the sandwich structure 100 (see, e.g., FIG. 3).

Each one of the first ply 152 and the second ply 154 is made of a fiber-reinforced polymer that includes fibers 150 and a matrix 156 in which the fibers 150 are embedded in a matrix 156. The fiber-reinforced polymer of the patch 115 defines a reinforcement strength of the patch 115. The plies of the patch 115, including the first ply 152 and the second ply 154, are stacked together. When stacked, a bottommost surface of a bottommost ply of the patch 115 defines a bottom surface or a first surface 136 of the patch 115 and a topmost surface of a topmost ply of the patch 115 defines a top surface or a second surface 138 of the patch 115, which is opposite the first surface 136. The patch 115 shown in FIG. 2 is not yet bonded or cured to the outer surface 104 of the sandwich structure 100.

The patch 115, in some examples, has a relief hole 116. The relief hole 116 extends entirely through the thickness of the patch 115 and may be centrally located. As described in more detail below, the relief hole 116 helps to reduce planar stresses in the patch 115 and allows for the release of pressure or potting material as the potting material is cured. The central location of the relief hole 116 can help to enhance the bond between the patch 115 and the cured potting compound 110.

The fibers 150 of each one of the plies of the patch 115 can be made of any of various materials, such as carbon, fiberglass, and the like. In some examples, the fibers 150 are woven. For example, some of the fibers 150 extend perpendicularly relative to others of the fibers 150 to form a woven ply. In other examples, the fibers 150 in each one of the plies are unidirectional and oriented to extend in a particular direction relative to the patch 115 and/or the structural reinforcement 114. For example, as shown in FIG. 2, the fibers 150 of the first ply 152, which defines the first surface 136 of the patch 115, are oriented in a first direction 158 that is angled relative to a second direction 160. In contrast, the fibers 150 of the second ply 154, which defines the second surface 138 of the patch 115, are oriented in the second direction 160. In other words, the fibers 150 of the first ply 152 of the patch 115 are oriented at a different angle than the fibers of the second ply 154 of the patch 115. In some examples, the first direction 158 is angled 90° or 45° relative to the second direction 160, or in other examples, angled at some other angle, such as 15°, 30°, 60°, and the like, relative to the second direction 160. In some examples, the orientations of the fibers 150 in the plies of the patch 115 are symmetric about a midplane of the patch 115.

The patch 115 has a thickness T1, a length L1, and a width W1. In some examples, like shown in FIG. 2, the patch 115 has a patch curvature, defined by radius R1 and/or radius R2. Radius R1 defines a curvature along the length L1 or first direction 158 of the patch 115. Radius R2 defines a curvature along the width W1 or second direction 160. In some examples, the curvature defined by radius R1 and/or R2 is different from the curvature of the sandwich structure 100. In other words, in some examples, the curvature of the patch 115 can be changed, if needed, to apply the patch 115 over the abnormality 112 on the sandwich structure 100. In some examples, the patch 115 is heated and/or adjusted to change the patch curvature (e.g., radius R1 and/or radius R2) to complement the composite curvature of the sandwich structure 100.

The dimensions of the width W1 and the length L1 define an area A1 of the patch 115. In one example, the patch 115 has a curvature defined by radius R1 and/or radius R2 and an area A1 defined by the width W1 and the length L1. In such an example, the patch 115 has an area A1 that is predetermined and curved. In some examples, the radius R1 and the radius R2 are zero, such that the patch 115 is planar or flat and the patch 115 defines an area A1 that is predetermined and flat.

Figure 5:
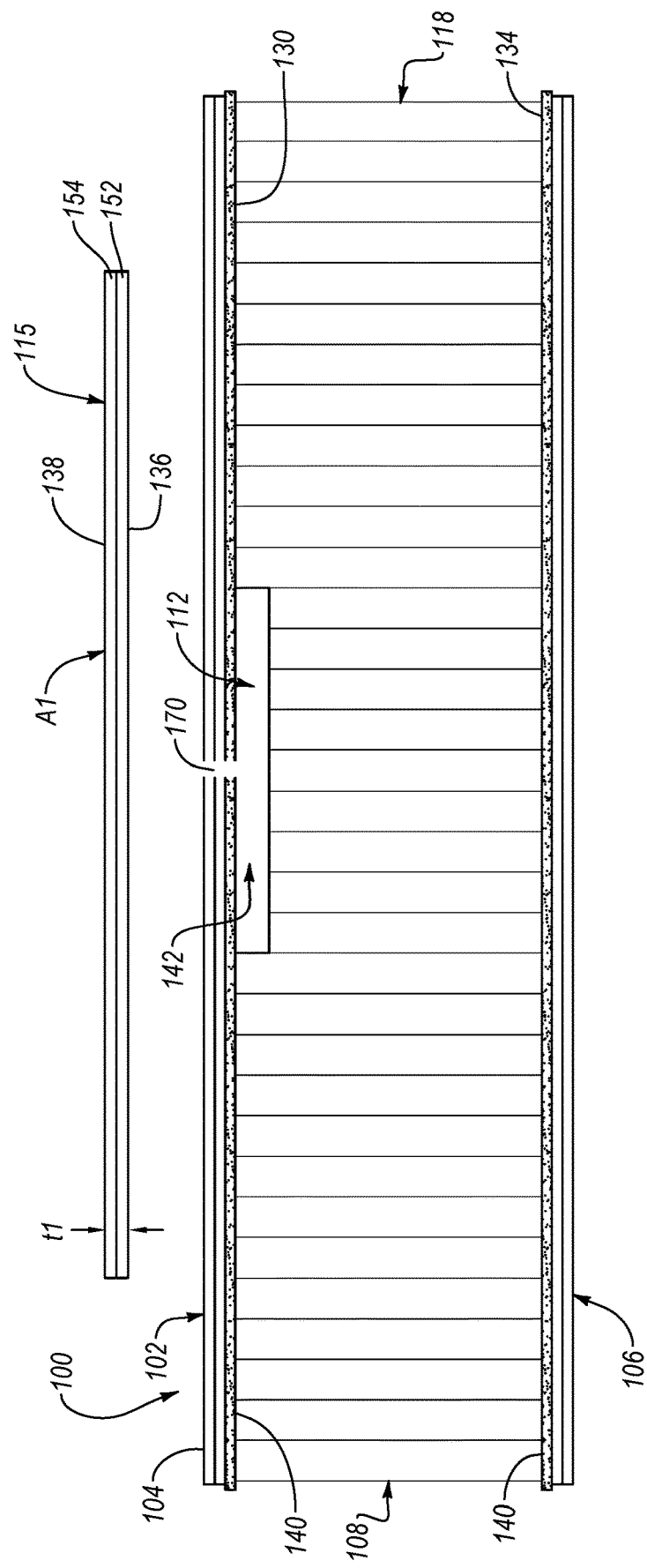
FIG. 5 is a schematic, sectional, side elevation view of a honeycomb structure having an abnormality, according to one or more examples of the present disclosure.

Referring now to FIG. 3, the outer surface 104 of the sandwich structure 100 is defined by the first sheet 102 of the sandwich structure 100. The patch 115 is bonded to the outer surface 104 of the first sheet 102. The first sheet 102 is on an opposite side of the sandwich structure 100 than the second sheet 106. A core 108 of the sandwich structure 100 is interposed between the first sheet 102 and the second sheet 106. As shown in FIG. 5, an adhesive 140 bonds opposite sides of the core 108 to the first sheet 102 and the second sheet 106, respectively.

As used herein, the first sheet 102 and the second sheet 106 are arbitrary and used to describe a relative location of the structural reinforcement 114. The structural reinforcement 114 may be positioned on either side of the sandwich structure 100 (e.g., either the first sheet 102 or the second sheet 106). As used herein, the first sheet 102 is used to designate the side of the sandwich structure 100 to which the structural reinforcement 114 is applied. However, the structural reinforcement 114 may be applied to either or both sides (e.g., the first sheet 102 and/or the second sheet 106) of the sandwich structure 100.

The core 108 may have different materials, properties, and/or configurations. For example, the core 108 may be primarily hollow or have an inserted/injected material. In one example, the core 108 is an organic material, such as paper. In another example, the core 108 is a metallic material, such as aluminum. The core 108 can be paper, metallic, or fiberglass and be formed into a honeycomb structure 118. The honeycomb structure 118 is interposed such that elongated channels 164 of the honeycomb structure 118 support and separate the first sheet 102 relative to the second sheet 106. The honeycomb structure 118 provides a shear and/or bending strength to the sandwich structure 100. In one example, the core 108 separates the first sheet 102 from the second sheet 106 to create a shear panel capable of carrying a shear load.

Figure 4:
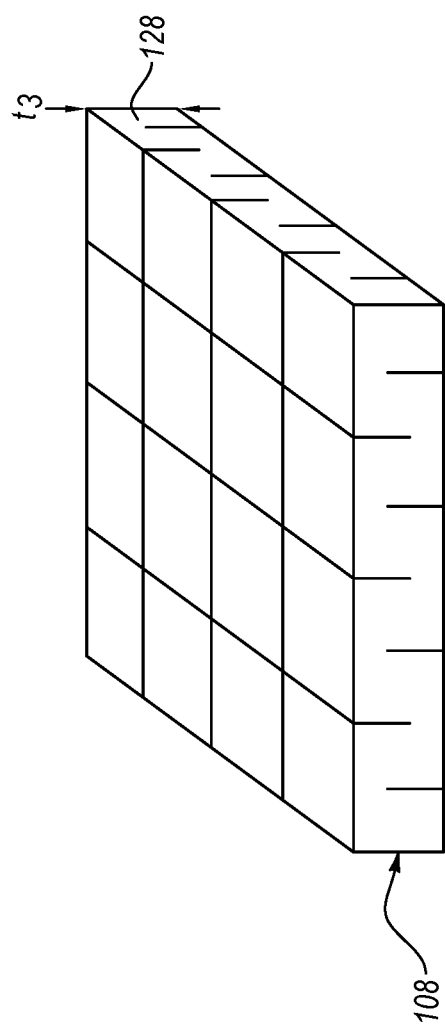
FIG. 4 is a schematic perspective view of a foam core, according to one or more examples of the present disclosure.

In other examples, the core 108 does not include a honeycomb structure, but rather is a foam core. Referring to FIG. 4, a foam material 128 of the core 108 is shown. The foam material 128 can be inserted and/or injected between the first sheet 102 and the second sheet 106. The foam material 128 separates the first sheet 102 and the second sheet 106. In various examples, the foam material 128 expands in the core 108 and/or includes one or more slots 168 that define a bending strength of the core 108. The foam material 128 may be injected and/or inserted into the core 108 to separate the first sheet 102 from the second sheet 106. In one example, the cured potting compound 110 of the structural reinforcement 114 extends through a partial thickness T3 of the core 108 having the foam material 128. For example, the cured potting compound 110 bonds to the foam material 128 in the core 108. In another example, the foam material 128 is completely removed from the cavity 142 before packing the uncured potting compound 144 into the core 108 and/or curing.

The first sheet 102 and the second sheet 106 have inner surfaces 130 and/or 134 facing the core 108 and outer surfaces (e.g., outer surface 104) external to the core 108. For example, the inner surface 130 of the first sheet 102 is adjacent to the core 108 and opposite the outer surface 104.

FIG. 5 shows an abnormality 112 that is limited to a disbond in the honeycomb structure 118. The abnormality 112 shows the core 108 of the sandwich structure 100 has been disbonded from the first sheet 102. For example, the abnormality 112 in FIG. 5 is limited to the interface between the core 108 and the first sheet 102. Accordingly, the abnormality 112, in one example, is the delamination/disbond between the honeycomb structure 118 of the core 108 and the first sheet 102. The abnormality 112 between the core 108 and the honeycomb structure 118 causes a reduced shear strength and/or bending strength. In various examples, the abnormality 112 in the core 108 can be repaired by removing the first sheet 102 and/or injecting the core 108 with uncured potting compound 144. In another example, the core 108 can be injected with uncured potting compound 144 through an injection site 170. When the injected uncured potting compound 144 is injected, in various embodiments, the patch 115 of the structural reinforcement 114 is also bonded and/or cured on the first sheet 102, as shown in FIG. 6.

Figure 6:
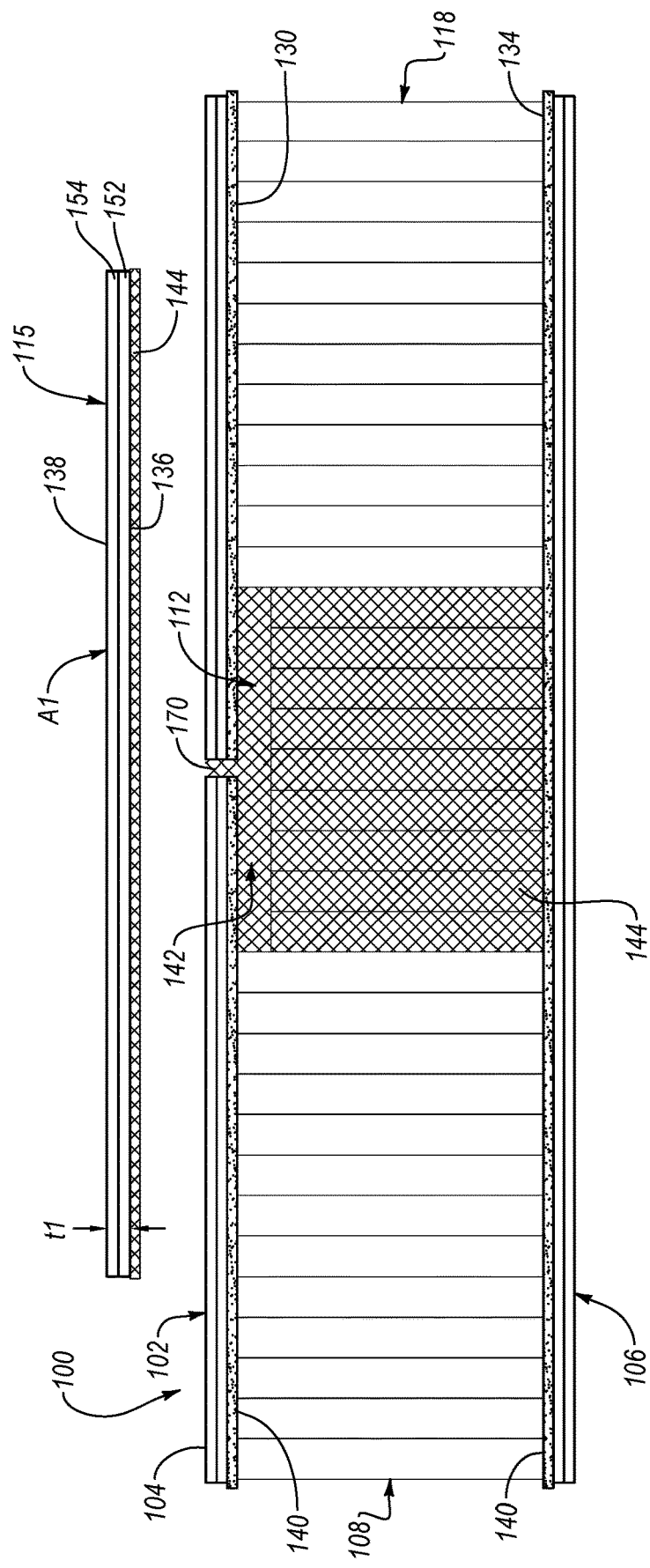
FIG. 6 is a schematic, sectional, side elevation view of the honeycomb structure of FIG. 5 and a structural reinforcement, according to one or more examples of the present disclosure.

With reference to FIG. 6, the uncured potting compound 144 is injected into the abnormality 112 in the core 108 and fills the cavity 142 of the disbond between the honeycomb structure 118 and the first sheet 102. The uncured potting compound 144 may also be injected into an abnormality 112 in the core 108 that fills the cavity 142 for a disbond between a foam material 128 (FIG. 4) or other type of material in the core 108. Further as shown in FIG. 6, the uncured potting compound 144 fills the cavity 142 between the disbond in the core 108 and the first sheet 102. In various embodiments, the uncured potting compound 144 may fill only an upper portion of the cavity 142. For example, uncured potting compound 144 may be injected over the foam material 128 of the core 108 to bond the foam material 128 directly to the inner surface 130 of the first sheet 102. Stated differently, the uncured potting compound 144 may extend only partially through the core 108 or may extend from the inner surface 134 of the second sheet 106 to the inner surface 130 of the first sheet 102, as shown in FIG. 6.

Figure 7:
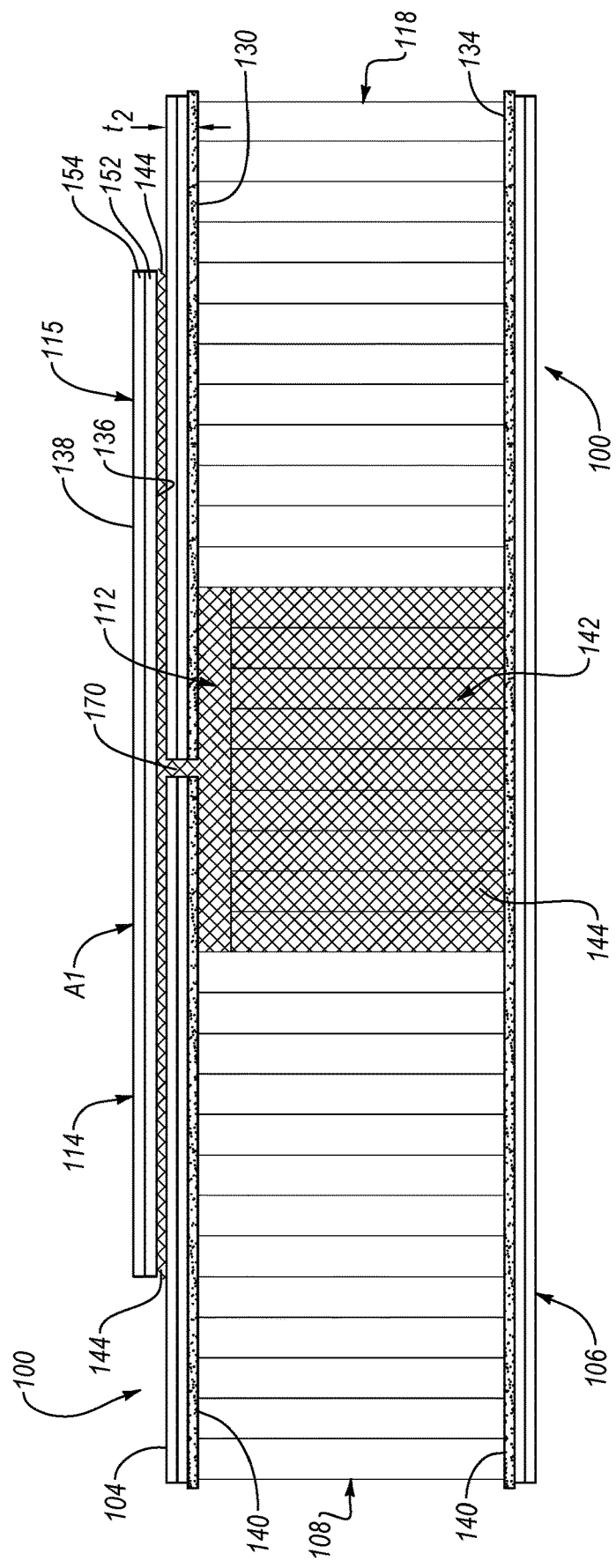
FIG. 7 is a schematic, sectional, side elevation view of a patch of the structural reinforcement of FIG. 6 applied to the honeycomb structure of FIG. 6, according to one or more examples of the present disclosure.

FIG. 7 shows that when the abnormality 112 includes a disbond in the core 108 and does not affect the first sheet 102, the uncured potting compound 144 can be injected into the core 108 through the injection site 170. The uncured potting compound 144 is injected through the injection site 170 to fill the core 108 with the uncured potting compound 144 without disturbing the first sheet 102 surrounding the injection site 170. The uncured potting compound 144 is cured to form the cured potting compound 110, which reinforces the core 108. In other words, when the uncured potting compound 144 is cured in the honeycomb structure 118, the cured potting compound 110 bonds the core 108 to the first sheet 102. In various examples, the structural reinforcement 114 is bonded directly to the first sheet 102.

FIG. 7 shows that the injection of the uncured potting compound 144 may extend past the abnormality 112 in the core 108. For example, the injected uncured potting compound 144 may fill a cavity 142 that extends beyond the disbond. The uncured potting compound 144 completely fills the cavity 142 and bonds directly to the honeycomb structure 118 of the core 108.

As shown in FIGS. 6 and 7, the structural reinforcement 114 may not utilize a relief hole 116. FIGS. 6 and 7 also show the bonding of the uncured potting compound 144, which becomes the cured potting compound 110 on an inner surface 130 of the first sheet 102 and the inner surface of the second sheet 106.

Figure 8:
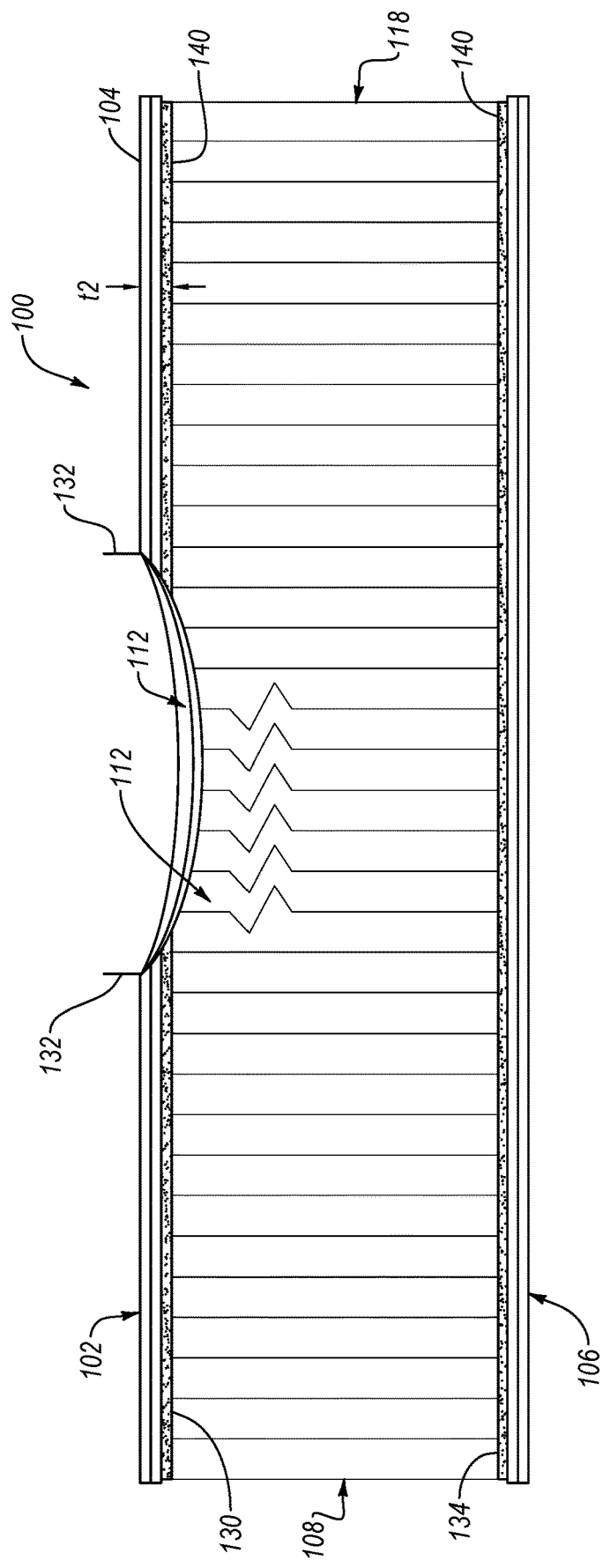
FIG. 8 is a schematic, sectional, side elevation view of a honeycomb structure that has an abnormality in a first sheet and a core of the honeycomb structure, according to one or more examples of the present disclosure.
Figure 9:
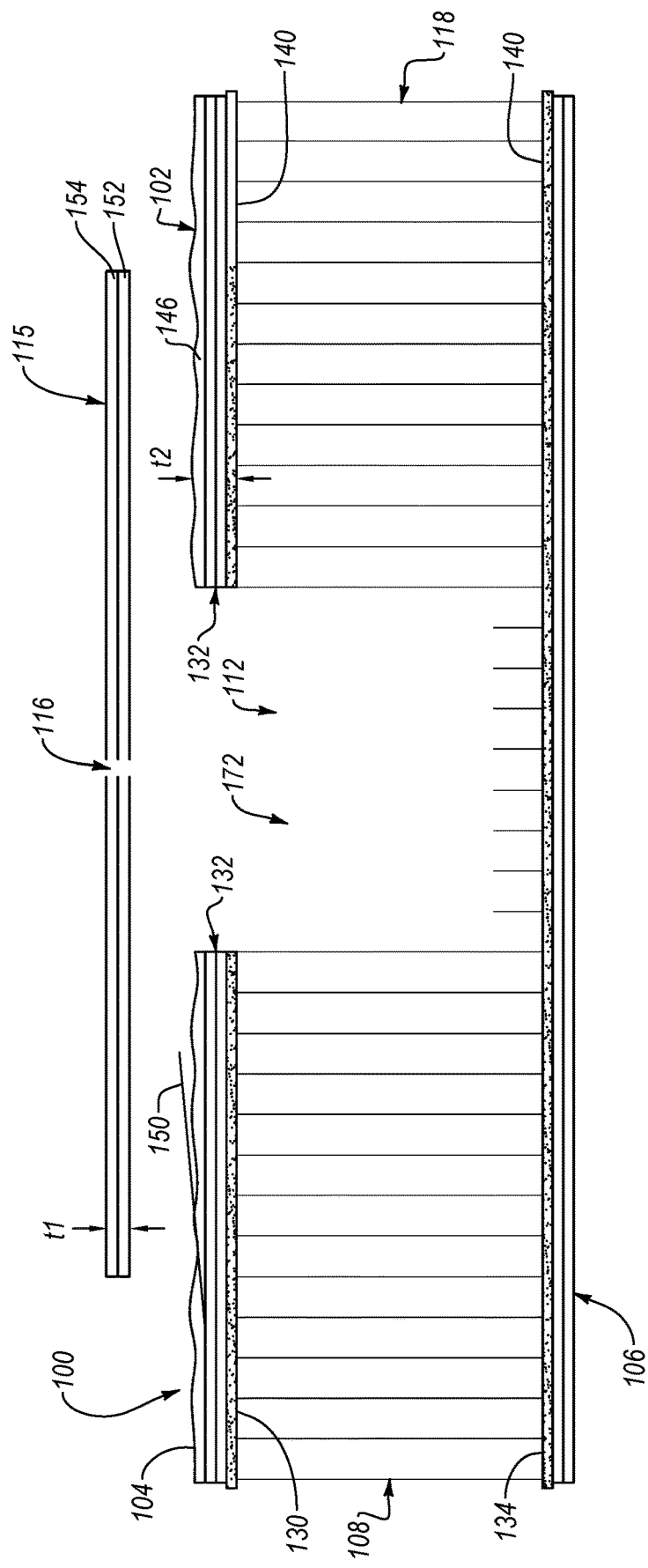
FIG. 9 is a schematic, sectional, side elevation view of a patch of a structural reinforcement and the honeycomb structure of FIG. 8, shown with a portion of the first sheet and the core of the honeycomb structure removed to form a cavity in the honeycomb structure, according to one or more examples of the present disclosure.

FIG. 8 shows an abnormality 112 that may include impact damage on the plies in the first sheet 102 and/or buckling between the core 108 and the first sheet 102. With reference to FIGS. 8 and 9, when the abnormality 112 is in both the first sheet 102 and the core 108, a cavity 142 is formed by removing a portion of the first sheet 102 and a portion of the core 108. In some examples, the cavity 142 penetrates an entirety of the first sheet 102 and at least a portion of the core 108. The cavity 142 also removes a coating layer 146 on the outer surface 104 of the first sheet 102, sometimes referred to as a sacrificial or paint layer. The coating layer 146 includes any non-structural layer, such as paint and/or fiberglass, covering the outer surface 104 of the first sheet 102.

FIG. 9 shows the first sheet 102 and the honeycomb structure 118 with the cavity 142 and the abnormality 112 removed. As shown, the structures adjacent to the cavity 142 and/or the abnormality 112 are removed to create a removed portion 172 without the abnormality 112. Stated differently, the removed portion 172 includes the abnormality and the cavity 142. The coating layer 146 and/or any fibers 150 may be abraded and removed before the patch 115 is applied on the first sheet 102 and/or the uncured potting compound 144 is packed into the removed portion 172. For example, any fibers 150 trapped in the removed portion 172 or on the coating layer 146 are removed and the coating layer is abraded to provide the patch 115 a clean outer surface 104 to cure the patch 115.

Figure 13:
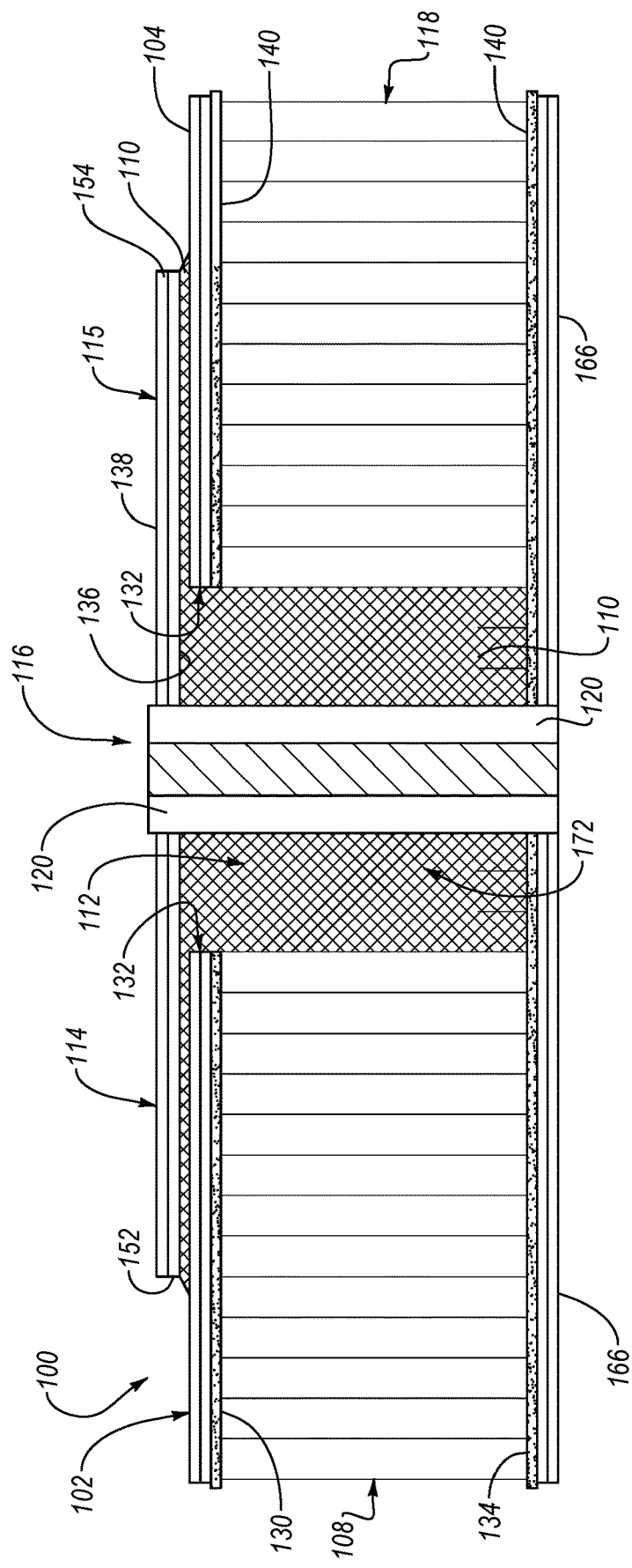
FIG. 13 is a schematic, sectional, side elevation view of a honeycomb structure, a structural reinforcement bonded to the honeycomb structure, and a bushing embedded in the structural reinforcement, according to one or more examples of the present disclosure.

The removed portion 172 extends through the first sheet 102 and at least partially into or through the core 108. In one example, the removed portion 172 passes entirely through the core 108 and the adhesive 140 on the inner surface 134 of the second sheet 106. In this example, the uncured potting compound 144 bonds directly to the inner surface 134 of the second sheet 106. In another example, the removed portion 172 passes entirely through the core 108, the adhesive, and the inner surface of the second sheet 106, for example, to install a bushing 120 (FIG. 13). In this example, a portion of the second sheet 106 is removed. The removed portion 172 defines a peripheral edge 132 about the abnormality 112 in the first sheet 102. The patch 115 extends over the removed portion 172 and has a relief hole 116 extending through the thickness T1 of the patch 115.

Figure 10:
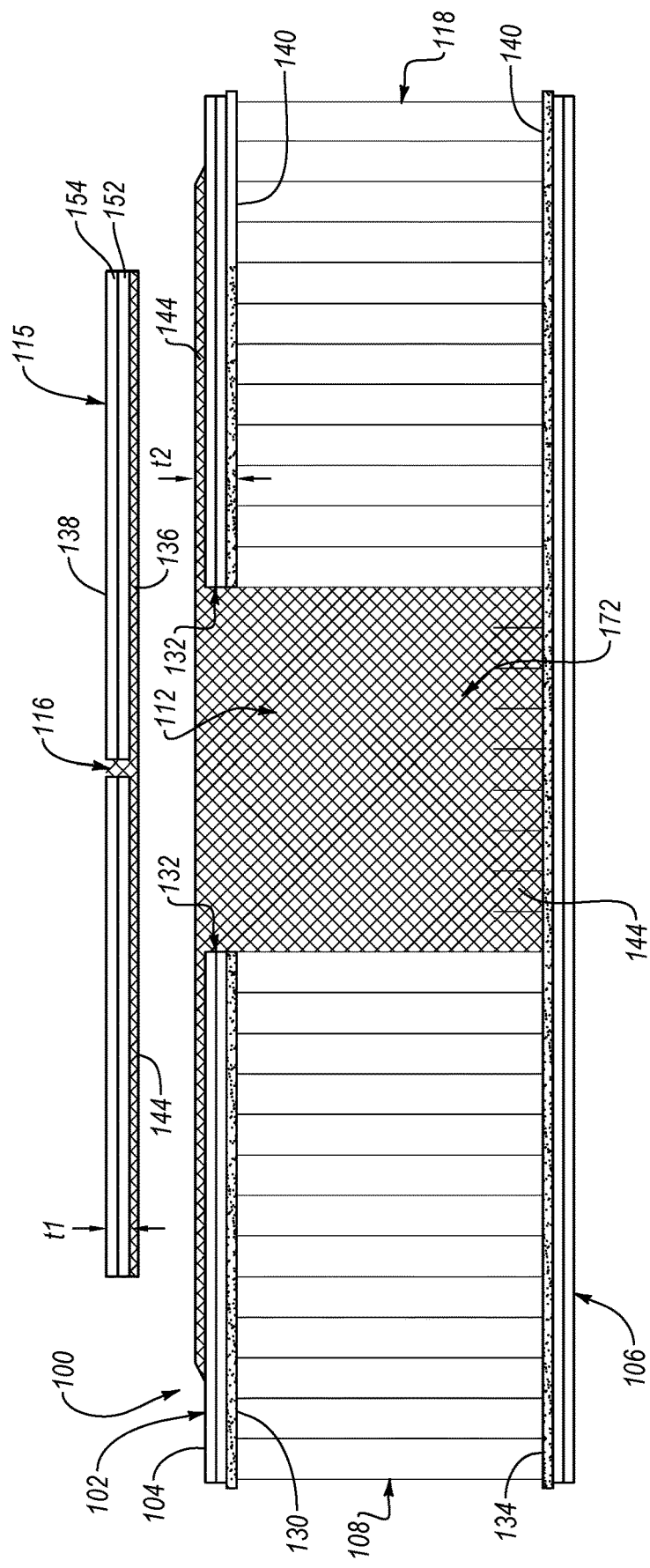
FIG. 10 is a schematic, sectional, side elevation view of the patch and the honeycomb structure of FIG. 9, as well as a potting compound of the structural reinforcement that is disposed within the cavity in the honeycomb structure, according to one or more examples of the present disclosure.

With reference to FIG. 10, the uncured potting compound 144 is packed into the removed portion 172. The uncured potting compound 144 is also applied to the first surface 136 of the patch 115 and/or the outer surface 104 of the first sheet 102. The relief hole 116 extends through the thickness T1 of the patch 115 and uncured potting compound 144 extends through the relief hole 116. The uncured potting compound 144 is applied to the first surface 136 of the patch 115 and packed into the removed portion 172. The uncured potting compound 144 is also applied to the outer surface 104 of the first sheet 102. Pressure and/or heat are applied on the second surface 138 of the patch 115. The pressure and/or heat cures the patch 115 to the first sheet 102 and cures the uncured potting compound 144 packed within the removed portion 172.

When the abnormality 112 is removed prior to the structural repair of the first sheet 102 and/or the core 108, the removed portion 172 is filled with an uncured potting compound 144 and cured. In various embodiments, the removed portion 172 penetrates the first sheet 102 and/or the core 108 at the abnormality 112 and entirely removes the abnormality 112 from the sandwich structure 100. The uncured potting compound 144 is packed into the core 108 at the removed portion 172 and applied to the second surface 138 of the structural reinforcement 114. The patch 115 covers the removed portion 172, and the uncured potting compound 144 is cured. The cured potting compound 110 (FIG. 12) bonds the patch 115 of the structural reinforcement 114 to the sandwich structure 100.

Various bonds are created by the cured potting compound 110 between the patch 115 and the sandwich structure 100 that repair the sandwich structure 100 and restore the strength of the sandwich structure 100. For example, the bond created between the first sheet 102 and the patch 115 has a different structural strength than the bond created through the core 108 between the patch 115 and the second sheet 106. The cured potting compound 110 is interposed between and bonded to the first surface 136 of the patch 115 and the outer surface 104 of the first sheet 102.

The patch 115 is coupled to the outer surface 104 of the first sheet 102 over the abnormality 112 that is removed from the core 108 with the cured potting compound 110. The cured potting compound 110 is interposed between the patch 115 and the abnormality 112 in the core 108. For example, the cured potting compound 110 extends between the patch 115 and the second sheet 106 and is bonded directly to the inner surface 134 of the second sheet 106 with the cured potting compound 110.

Figure 11:
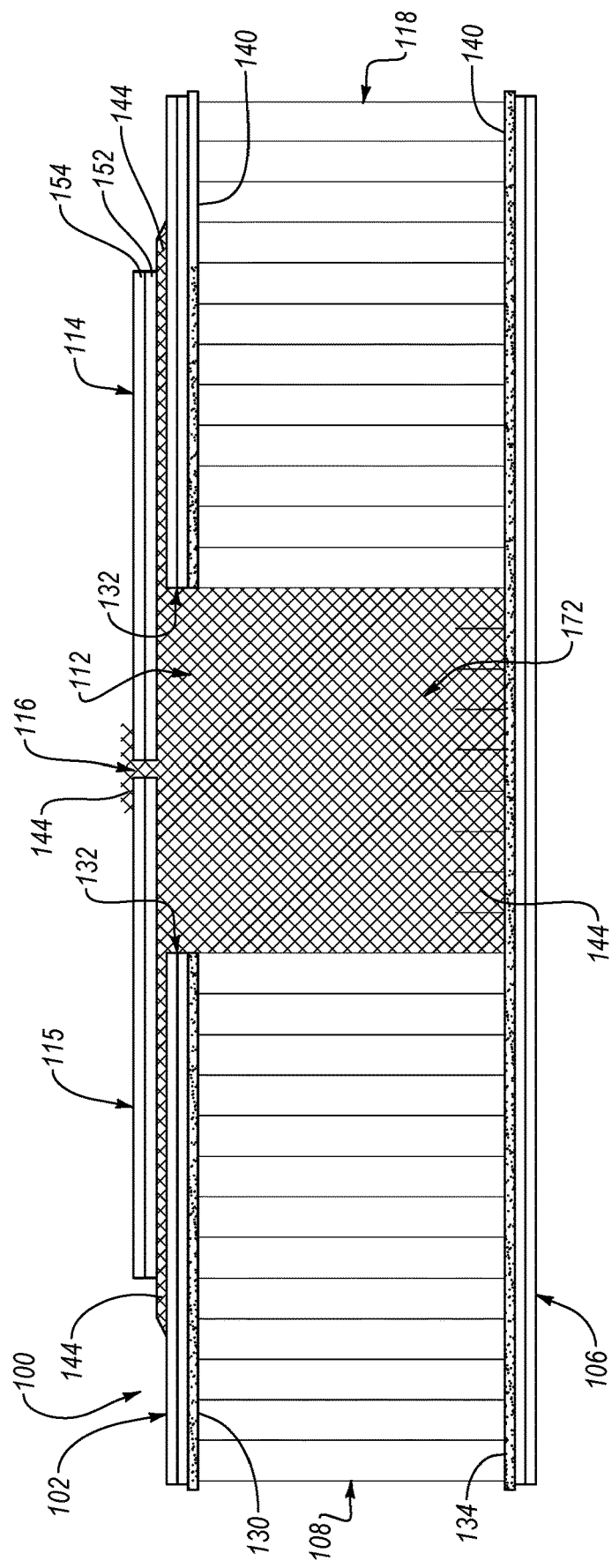
FIG. 11 is a schematic, sectional, side elevation view of the patch of FIG. 10 applied onto the honeycomb structure, according to one or more examples of the present disclosure.

In the example shown in FIG. 11, when the pressure is applied to the second surface 138 of the patch 115, the uncured potting compound 144 pushes through the relief hole 116 and extends over the core 108. For example, pressure on the patch 115 forces excess uncured potting compound 144 through the relief hole 116. Similarly, mechanical pressure forces the uncured potting compound 144 between the structural reinforcement 114 and the first sheet 102 along the outer surface 104 of the first sheet 102. In one example, the excess uncured potting compound 144 is wiped or cleaned off the second surface 138 of the patch 115 and/or the outer surface 104 of the first sheet 102 before curing. Excess uncured potting compound 144 is removed before curing. In another example, the excess is cured, and the cured potting compound 110 is removed, e.g., after the curing process. The excess uncured potting compound 144 is cured on the second surface 138 of the patch 115 and/or the outer surface 104 of the first sheet 102 and abraded or otherwise removed following the cure. In various examples, a sacrificial ply is placed over the patch 115 to create a moldable aerodynamic surface over the structural reinforcement 114.

FIG. 11 illustrates that when the uncured potting compound 144 is cured, the cured potting compound 110 bonds to the second surface 138 of the structural reinforcement 114. The cured potting compound 110 may be located in substantially the same location as the uncured potting compound 144 or excess uncured potting compound 144 may be removed in FIG. 11 prior to curing in FIG. 12. For example, when the uncured potting compound 144 is cured, the cured potting compound 110 extends and is cured from the first surface 136 and the second surface 138 of the structural reinforcement 114 through the relief hole 116. The uncured potting compound 144 is bonded to the adhesive 140 at the second sheet 106. The first sheet 102 and the second sheet 106 are bonded to the honeycomb structure 118 with the adhesive 140. In various examples, the adhesive 140 on second sheet 106 may be entirely or partially removed before packing and/or curing the uncured potting compound 144.

Following the curing process, the cured potting compound 110 is bonded to various components in the cavity 142 and/or the removed portion 172. The cured potting compound 110 bonds the patch 115 to the outer surface 104 of the first sheet 102. For example, uncured potting compound 144 is packed to extend through the removed portion 172 and the cured potting compound 110 is cured to the inner surface 130 of the second sheet 106 and the outer surface 104 and/or inner surface 130 of the first sheet 102. In this configuration, the cured potting compound 110 extends between the inner surface 130 of the first sheet 102 and the inner surface 134 of the second sheet 106. In one example, the inner surface 134 of the second sheet 106 has the adhesive 140 directly interposed between the second sheet 106 and the cured potting compound 110 in the core 108.

Referring to FIG. 12, the uncured potting compound 144 is cured within the removed portion 172, which was created in the core 108 when the abnormality 112 was removed. In various examples, the cured potting compound 110 is coupled to the first sheet 102, the second sheet 106, and/or the patch 115. For example, the first surface 136 and/or the second surface 138 are directly bonded to an inner surface 130 of the second sheet 106. In this configuration, the cured potting compound 110 extends through the core 108 between the patch 115, on the first sheet 102, and the second sheet 106. In another example, the patch 115 is coupled over the removed portion 172 in the first sheet 102 and/or the core 108 (see, e.g., FIGS. 11-13). The removed portion 172 may be formed by removal of any delaminated and/or buckled portions of either the first sheet 102 and/or the core 108.

The abnormality 112 defines the size of the removed portion 172, which has a peripheral edge 132 that extends through the thickness T2 of the first sheet 102 (see, e.g., FIG. 9). For example, the peripheral edge 132 extends between the outer surface 104 and the inner surface 130 of the first sheet 102 in order to remove the abnormality 112 from the core 108.

The second sheet 106 has an outer surface 166 opposite the inner surface 134. In various examples, the inner surface 134 of the second sheet 106 is bonded directly to the structural reinforcement 114 with cured potting compound 110. For example, the first surface 136 of the patch 115 is opposite the inner surface 134 of the second sheet 106, and the first surface 136 of the patch 115 is bonded directly to the inner surface 134 of the second sheet 106 with the cured potting compound 110. In another example, the cured potting compound 110 may also bond to the outer surface 166 of the second sheet 106.

In various examples, the cured potting compound 110 bonds the outer surface 104 of the first sheet 102 to the first surface 136 of the patch 115. For example, the cured potting compound 110 is bonded to a portion of the inner surface 130, the peripheral edge 132, and/or an outer surface 104 of the first sheet 102. In another example, the cured potting compound 110 is bonded to an entirety of the first surface 136 of the patch 115 and a portion of the second surface 138 of the patch 115.

FIG. 12 shows a vacuum bag 148 and a heating blanket 149 attached to the sandwich structure 100 and enclosing the structural reinforcement 114. The vacuum bag 148 removes pressure locally and the heating blanket 149 adds heat. For example, the heating blanket 149 applies a local heat and the vacuum bag 148 removes pressure to cure the uncured potting compound 144 and/or the patch 115. In one example, the vacuum bag 148 reduces the pressure to create a clamping force on the patch 115 while curing the uncured potting compound 144. For example, the reduced pressure creates a vacuum on the patch 115 and increases the clamping force between the patch 115 and the first sheet 102 of the sandwich structure 100. Accordingly, the vacuum bag 148 reduces the pressure locally on the structural reinforcement 114 to increase the clamping force and improve the adhesion and/or cure of the cured potting compound 110 under the patch 115. In this manner, the vacuum bag 148 enhance the adhesion, bond, and/or cure between the patch 115 and the first sheet 102 of the sandwich structure 100.

The heating blanket 149 may regulate or control the local heat applied to cure the structural reinforcement 114. For example, the heating blanket 149 can maintain a constant temperature under the vacuum bag 148, focus the heat, and maintain the temperature over the patch 115 to cure the structural reinforcement 114. In this way, the heating blanket 149 enhances the bond of the cured potting compound 110. Specifically, the vacuum bag 148 and/or the heating blanket 149 can enhance the bond or cure developed between the patch 115 and the first sheet 102, the core 108, and/or the second sheet 106.

FIG. 13 shows a bushing 120 installed in the structural reinforcement 114. In various examples, the sandwich structure 100 may be designed to support an ancillary structure, such as a fastener, and/or otherwise couple or join another ancillary structure. When the abnormality 112 occurs at or near the fastener in the sandwich structure 100, the structural repair may remove the fastener and use a bushing 120 to restore the bearing and/or shear strength of the fastener at or near the abnormality 112. In this configuration, a bushing 120 may be installed within the structural repair to restore the joint between the sandwich structure 100 and the ancillary structure supported through the fastener.

The bushing 120 provides a repaired location for the fastener within the sandwich structure 100. The bushing 120 shown in FIG. 13 extends through the patch 115, the first sheet 102, the core 108, and the second sheet 106. The removed portion 172 can extend through the second sheet 106, such that the bushing 120 extends entirely through the sandwich structure 100 from the outer surface 166 of the second sheet 106 to the second surface 138 of the patch 115. This enables a fastener to pass through the bushing 120. In other examples, the bushing 120 can also partially extend through the sandwich structure 100. At least a portion of the cured potting compound 110 is located within the relief hole 116 and surrounds the bushing 120. An outer diameter of the bushing 120 extends through the relief hole 116. In other words, enlarging the size of the relief hole 116 may accommodate the diameter size of the bushing 120.

In one example, the bushing 120 in the sandwich structure 100 is designed to include a fastener. In various embodiments, the bushing 120 is made from a metal material, such as titanium, nickel, aluminum, and/or steel. Various examples of bushing materials include low and mild carbon steel, alloy steels, stainless steel, aluminum, brass, copper, silicon bronze, Monel, Inconel, Hastelloy, titanium and/or nitronic metallic materials. The bushing 120 can be thermo-fit, press fit, and/or shrink fit. In other embodiments, the bushing 120 is made from a non-metallic material, such as cast nylon.

In various examples, the abnormality 112 in the core 108 and/or the first sheet 102 is repaired, and the bearing strength of the fastener is restored. The patch 115 and the cured potting compound 110 of the structural reinforcement 114 provide a structural repair with an increased bending strength for the sandwich structure 100. In one example, the repair bending strength is equal to or greater than the design bending strength. Similarly, the cured potting compound 110 creates a repair bearing, shear, and/or compressive strength equal to or greater than the design bending strength. In various embodiments, the structural repair uses the cured potting compound 110 to restore the strength and/or stiffness to match the design stiffness. For example, the structural repair restores the strength and/or stiffness of the repaired area to match or exceed the expected loads in bearing, bending, buckling, compression, shear, tension, and the like. In various embodiments described herein, the structural repair is a permanent repair.

Figure 14:
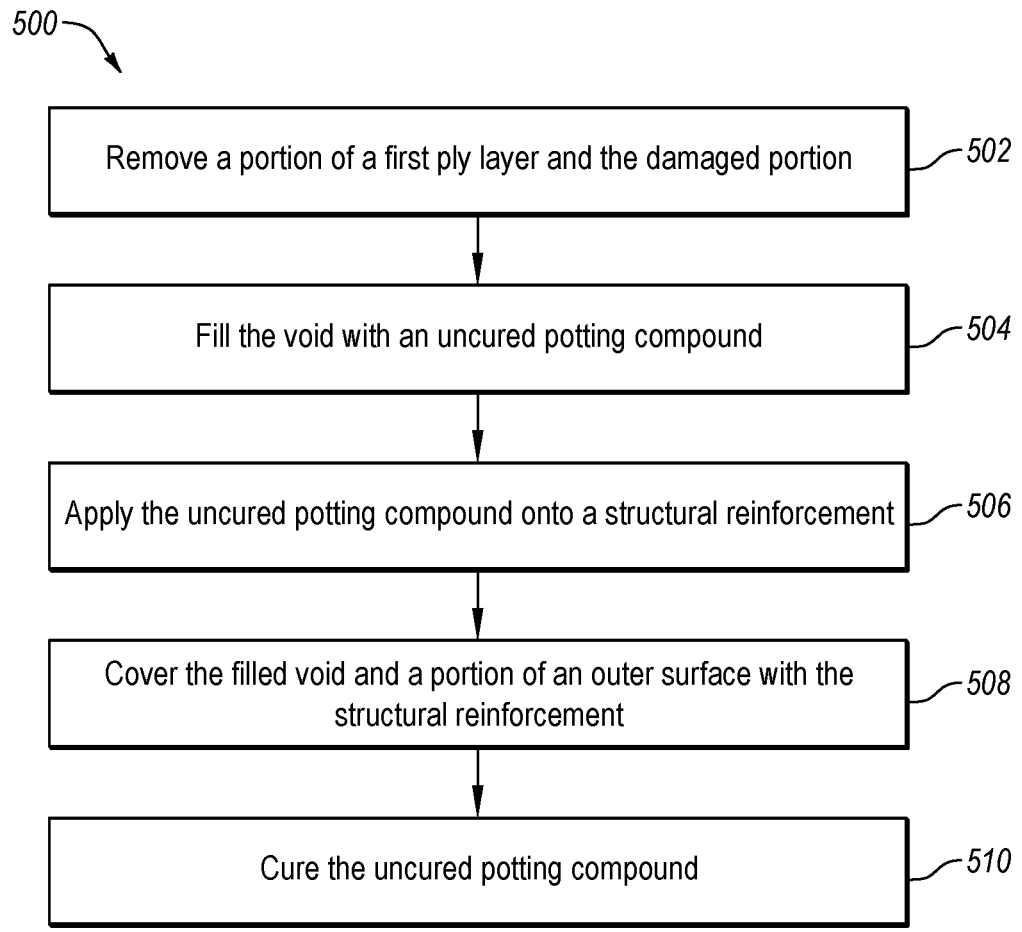
FIG. 14 is a schematic flow diagram of a method of repairing a composite sandwich panel, according to one or more examples of the present disclosure.

FIG. 14 is a schematic flow diagram of a method 500 of repairing a sandwich structure 100. The method 500 comprises removing 502 a portion of the first sheet 102 and the abnormality 112 in the first sheet 102 and/or the core 108 to form a cavity 142 in the first sheet 102. The cavity extends to the core 108 of the sandwich structure 100 and is filled 504 with an uncured potting compound 144. The uncured potting compound 144 is applied 506 onto a structural reinforcement 114 and fills the cavity 142. The patch 115 covers the cavity 142 filled with the uncured potting compound 144 and a portion of the outer surface 104 on the first sheet 102. In various examples, the uncured potting compound 144 extends between an inner surface 134 of a second sheet 106 and the structural reinforcement 114, and the uncured potting compound 144 extends between the portion of the outer surface 104 of the first sheet 102 and the structural reinforcement 114. The method 500 further includes curing 510 the uncured potting compound 144.

The cavity 142 penetrates through the core 108 under the first sheet 102. In some examples, the portion of the outer surface 104 of the first sheet 102 is abraded, and/or a coating layer 146 surrounding the cavity 142 on the first sheet 102 is removed. For example, one or more loose fibers are abraded from the outer surface 104 of the first sheet 102, and debris is removed from the cavity 142 in the core 108. The core 108 may be heated to remove moisture.

In some examples, the structural reinforcement 114 is penetrated to create a relief hole 116 that extends between the first surface 136 and the second surface 138 of the structural reinforcement 114. The uncured potting compound 144 is packed into the cavity 142 until the uncured potting compound 144 abuts an inner surface 130 of the first sheet 102 and/or extends at least partially through the relief hole 116. Excess uncured potting compound 144 is removed from the outer surface 104 of the first sheet 102 and/or the second surface 138 of the patch 115. For example, any excess uncured potting compound 144 adjacent to relief hole 116 on the patch 115 is removed. When the uncured potting compound 144 is cured, the inner surface 134 of the second sheet 106 bonds to the inner surface 130 of the first sheet 102.

In some examples, a vacuum bag 148 and heat source (e.g., a heating blanket 149) is applied over the patch 115 of the structural reinforcement 114. The vacuum bag 148 reduces pressure locally at the patch 115 and the heat source applies heat at the patch 115. In some examples, the vacuum bag 148, as well as the heating blanket 149, can help cure the uncured potting compound 144, which forms a thermoset bond between the patch 115 and the outer surface 104 of the first sheet 102.

In some examples, loose glass fiber reinforced plastic (GFRP) and/or carbon fiber reinforced plastic (CFRP) fibers 150 are packed into the uncured potting compound 144, and the uncured potting compound 144 is cured having the GFRP and/or CFRP fibers 150 embedded within the potting compound 144.

Before curing, the bushing 120 is cleaned and prepared before being installed. The bushing 120 can be installed within the cavity 142 and the uncured potting compound 144. For example, the bushing 120 extends through a relief hole 116 in the patch 115 and/or through the second sheet 106.

One or more patches 115 of the structural reinforcement 114 may be heated to mold the structural reinforcement 114. The structural reinforcement 114 comprises an area (A1) and a contour (R1 and R2), and each ply 152 in the patch 115 is pre-arranged in a predefined orientation relative to other plies 152/154 in the patch 115. For example, the patch 115 is heated to partially bond each ply 152 in the patch 115 and change the contour (R1 and R2) of the structural reinforcement 114.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive unless expressly specified otherwise. The terms "a," "an," and "the" also refer to "one or more" unless expressly specified otherwise. Further, the term "plurality" can be defined as "at least two." Moreover, unless otherwise noted, as defined herein, a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent to another element without being in contact with that element.

As used herein, the phrase "at least one of", when used with a list of items, means different combinations of one or more of the listed items may be used, and only one of the items in the list may be needed. The item may be a particular object, thing, or category. In other words, "at least one of"

means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc., are used herein merely as labels and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having the potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method of installing a structural reinforcement on a sandwich structure, the method comprising:
    removing a portion of a first sheet and a core of the sandwich structure to form a cavity in the first sheet and the core of the sandwich structure;
    filling the cavity in the sandwich structure with an uncured potting compound such that at least a portion of the uncured potting compound extends onto an outer surface of the first sheet;
    applying the uncured potting compound on a surface of a patch;
    covering the cavity in the core and the outer surface of the first sheet with the patch, wherein:
        the uncured potting compound extends between an inner surface of a second sheet of the sandwich structure and the patch to repair an abnormality in the core of the sandwich structure; and
        the uncured potting compound extends between the outer surface of the first sheet of the sandwich structure and the patch to adhere the patch to the first sheet; and
    curing the uncured potting compound.

2. The method of claim 1, wherein removing a portion of the first sheet and the core to form the cavity further comprises abrading the outer surface of the first sheet.

3. The method of claim 1, wherein the method further comprises, prior to filling the cavity with the uncured potting compound:
    removing a coating layer on the first sheet surrounding the cavity;
    penetrating the core under the first sheet to create the cavity extending to the second sheet; and
    removing a loose fiber from the coating layer on the outer surface of the first sheet.

4. The method of claim 1, wherein the method further comprises, prior to filling the cavity with the uncured potting compound:
    removing debris from the cavity in the core; and
    heating the core to remove moisture.

5. The method of claim 1, wherein the method further comprises, prior to applying the uncured potting compound onto the surface of the patch, penetrating the patch to create a relief hole extending between a second surface of the patch and the surface that the uncured potting compound is to be applied to the patch.

6. The method of claim 1, wherein filling the cavity with the uncured potting compound further comprises packing the uncured potting compound into the cavity until the uncured potting compound abuts an inner surface of the first sheet, such that when the uncured potting compound is cured, the inner surface of the second sheet bonds to the inner surface of the first sheet.

7. The method of claim 1, wherein, the method further comprises, after covering the cavity with the patch and prior to curing the uncured potting compound:
    removing excess uncured potting compound from the outer surface of the first sheet; and
    removing excess uncured potting compound adjacent to a relief hole from a second surface of the patch.

8. The method of claim 1, wherein the method further comprises, after covering the cavity with the patch and prior to curing the uncured potting compound:
    applying a vacuum bag and a heat blanket over the patch;
    applying heat with the heat blanket and reducing pressure locally within the vacuum bag; and
    curing the uncured potting compound to form a thermoset bond between the patch and the outer surface of the first sheet.

9. The method of claim 1, wherein the method further comprises, prior to covering the cavity with the patch:
packing loose fibers into the uncured potting compound; and
curing the uncured potting compound with the loose fibers packed in the uncured potting compound.

10. The method of claim 1, further comprising installing a bushing within the cavity and the uncured potting compound, wherein the bushing extends through a relief hole in the patch.

11. The method of claim 1, further comprising heating the patch to mold the structural reinforcement, wherein:
the patch comprises an area and a contour;
a first ply is pre-arranged in a predefined orientation relative to a second ply in the patch; and
heating the patch at least partially bonds the first ply to the second ply in the patch and changes the contour of the structural reinforcement.

12. The method of claim 1, wherein curing the uncured potting compound forms a cured sandwich structure comprising:
the first sheet;
the second sheet, which is opposite the first sheet;
the core, which is interposed between and coupled to the first sheet and the second sheet;
the cavity, which is filled with cured potting compound;
a structural reinforcement coupled to the outer surface of the first sheet over and in the cavity, the structural reinforcement comprising:
the patch, which comprises a ply; and
the cured potting compound packed into the cavity and further located on the outer surface of the first sheet;
wherein:
the cured potting compound is interposed between and bonded to the patch and the cavity; and
the cured potting compound is interposed between and bonded to the patch and the outer surface of the first sheet.

13. The method of claim 12, further comprising disposing in the patch a relief hole extending through a thickness of the patch, wherein a portion of the cured potting compound is located within the relief hole.

14. The method of claim 12, further comprising defining within the core a honeycomb structure such that the honeycomb structure is adjacent to the cavity, wherein:
the honeycomb structure provides the first sheet and the second sheet a design bending strength;
the cured potting compound in the cavity provides a repair bending strength; and
the repair bending strength is equal to or greater than the design bending strength.

15. The method of claim 12, further comprising disposing a bushing within the sandwich structure, wherein:
the core is a honeycomb structure that surrounds the cured potting compound; and
the cured potting compound surrounds the bushing.

16. The method of claim 12, wherein:
the sandwich structure is an aircraft comprising an external wetted surface; and
the outer surface of the first sheet and the patch of the structural reinforcement define the external wetted surface of the aircraft.

17. The method of claim 12, wherein the core is made of a foam material and the cured potting compound extends through a partial thickness of the core.

18. The method of claim 12, wherein the first sheet further comprises:
an inner surface opposite the outer surface; and
a peripheral edge through a thickness of the first sheet that extends between the outer surface and the inner surface of the first sheet;
the second sheet further comprises an inner surface;
the patch comprises a first surface opposite a second surface; and
the cured potting compound is bonded to a portion of the inner surface of the first sheet, to the peripheral edge of the first sheet, to the inner surface of the second sheet, to an entirety of the first surface of the patch, and to a portion of the second surface of the patch.

19. The method of claim 18, further comprising directly interposing an adhesive between the second sheet and the cured potting compound in the cavity.

20. The method of claim 12, wherein the patch comprises:
a first ply having fibers embedded in a matrix to provide a strength to the first ply, the first ply defining a surface of the patch that is bonded to the cured potting compound; and
a second ply having fibers embedded in a matrix to provide a strength to the second ply, wherein the first ply is oriented relative to the second ply to provide a predetermined reinforcement strength to the patch.

* * * * *